Feb. 19, 1963   F. L. COWGILL   3,077,762
VALVE TESTING APPARATUS
Filed March 13, 1961
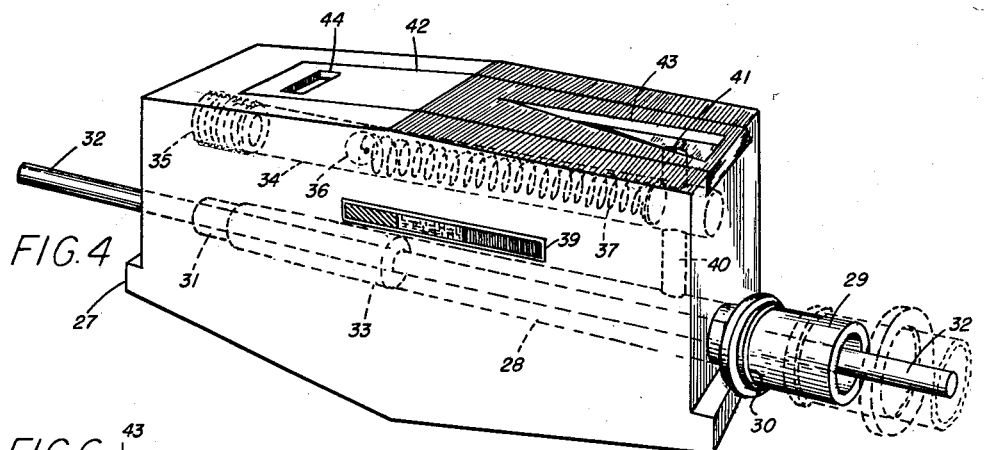
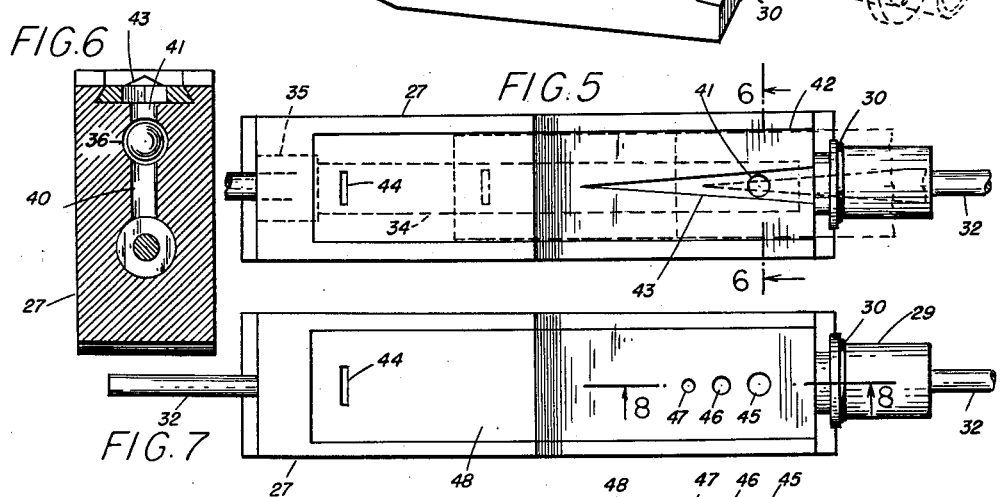
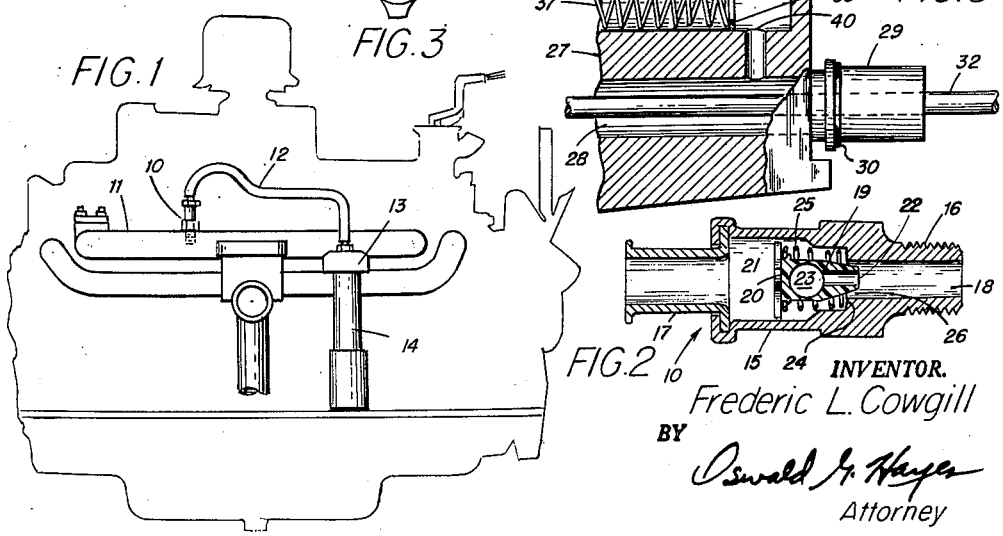
INVENTOR.
Frederic L. Cowgill
BY
Oswald G. Hayes
Attorney

United States Patent Office 3,077,762
Patented Feb. 19, 1963

3,077,762
VALVE TESTING APPARATUS
Frederic L. Cowgill, Paulsboro, N.J., assignor to Socony Mobil Oil Company, Inc., a corporation of New York
Filed Mar. 13, 1961, Ser. No. 95,281
11 Claims. (Cl. 73—4)

The present invention relates to devices for testing gas or other fluid control valves, more particularly automatic vacuum control valves such as crankcase breather valves under conditions which very closely simulate actual operating conditions. Valves of the latter character have recently been proposed in systems for controlling discharge by automotive engines of smog inducing components arising in crankcase spaces.

The pollution of the atmosphere by smog has become a serious problem in certain cities, and substantial efforts are being made to alleviate this undesirable and unhealthy contamination of the air. One of the suspected causes of smog is the fumes or vapors given off by the crankcases of internal combustion engines, chiefly automobile engines. An effective method of eliminating or at least minimizing this source of smog is to ventilate the crankcase through the intake manifold of the engine. By connecting a small tubing between the intake manifold and any point on the crankcase, as for instance the oil filler cap, suction is applied to the crankcase which draws a current of air therethrough carrying all of the gases, vapors and mists in the crankcase to the intake manifold. All new automobiles sold in one state are now required by statute to have operative systems for thus ventilating the crankcases.

In adopting this ventilating system it has been found necessary to install a control valve in the line between the crankcase and the intake manifold to avoid extreme maladjustment of the fuel-air ratio in the intake manifold. Suitable automatic vacuum control valves have been developed for the purpose and are commonly known as crankcase breather valves or as fuel reclaimers.

Crankcase breather valves have metering orifices of relatively small size and also utilize moving parts, springs and the like. In addition they must operate under very difficult conditions including extremes of high and low temperatures and much vibration while accurately regulating the passage of a mixture of gases and mists that include acidic compounds, water vapor, combustion products, light and heavy hydrocarbon vapors and dispersions of small droplets of oil in air as well as gum forming components. Despite this, it is imperative that these valves operate properly. This is important not only from considerations of public health and compliance with the law but also to insure proper and economical engine performance. Accordingly there is a distinct need for a testing device which will test these crankcase breather devices under substantially the same conditions as in their actual operation of ventilating automobile crankcases.

An object of the present invention is to provide a valve testing device for control valves.

A further object of the invention is to provide a simple and rugged device for testing automatic control valves.

A further object of the invention is to provide an apparatus for testing gas control valves which is simple and reliable.

Still another object of the invention is to provide apparatus for testing crankcase breather valves which is positive in action, simple to use, and shows the actual degree of efficiency of the valve under closely simulated operating conditions.

Other objects and advantages of the invention will be apparent to those skilled in the art from the detailed description herein below.

The present invention is an apparatus for testing a fluid control valve and comprises a body provided with a conduit adapted for connection to the valve under test, a passage in the body having one section in communication with a fluid source and another section in communication with the conduit, a pressure responsive member resiliently mounted in the passage, and an adjustable fluid bleeder means connecting the conduit with the fluid source for controlling the pressure drop of fluid flowing through the body. This enables the pressure responsive member to indicate by proportional movement the pressure differential between fluid source and the interior of the valve during tests under conditions approximating actual use. Other aspects of the invention include a follower reciprocably mounted in the conduit for determining the position of a movable element of said valve, a slidable gate for selectively restricting the flow of fluid through the bleeder channel in order to regulate the pressure drop through the valve testing device, a transparent body for the apparatus to permit visual observation of the position of the pressure responsive device and of the follower, and an index scale on the body of the valve tester to facilitate such observations.

For a better understanding of the nature and objects of this invention, reference should be had to the accompanying drawings which illustrate its principles and are not to be construed as restrictions or limitations on its scope.

FIGURE 1 is a skeleton elevation showing a typical installation of a crankcase breather valve;

FIGURE 2 is an axial section of a crankcase breather valve which may be tested with the novel valve testing device;

FIGURE 3 is an elevation of a throttling element of the valve of FIGURE 2;

FIGURE 4 is a perspective view of the valve testing device of the present invention;

FIGURE 5 is a plan view of the valve tester of FIGURE 4;

FIGURE 6 is a sectional elevation taken on the line 6—6 of FIGURE 5;

FIGURE 7 is a plan view of a modification of the novel testing device; and

FIGURE 8 is a fragmentary vertical section, partly in elevation, taken on center line 8—8 of the modification of FIGURE 7.

To facilitate the understanding of the present invention, the valves which it is designed to test will be described first in order that one may appreciate fully the functions of the new valve testing device.

In FIGURE 1 the crankcase breather valve 10 is shown attached to the intake manifold 11 of an automobile engine. The flexible tubing 12 connects the inlet of the breather valve to the cap 13 on the oil filler tube 14 which leads into the crankcase of the engine. When the valve tester of the present invention is employed for checking the operation of the breather valve with the engine running, the tubing 12 is removed from the inlet of valve 10 and the present testing device is connected to the valve inlet.

The crankcase breather valve 10 of FIGURE 2 is a spring-loaded automatic throttling valve designed to partially close and restrict the air flow therethrough when the pressure differential across the valve increases and to open as the pressure differential decreases. Such action is necessary to obtain proper engine performance because a valve of fixed orifice size would allow too much air and crankcase fumes to flow therethrough under idling conditions of high vacuum in the intake manifold (low absolute pressure) if the valve orifice were properly sized for engine speeds corresponding to normal highway speeds, wherein there is a low vacuum or high manifold pressure due to the substantial opening of the carburetor throttle valve. This problem is, of course, complicated by the fact that the quantity of fuel and air passing through the intake manifold of an idling engine is relatively small and therefore the engine is readily subject to stalling upon the introduction of an excessive amount of air. Conversely, with a breather valve having a fixed orifice of the proper size for idling conditions, as the vacuum pressure decreased upon opening the throttle to accelerate to highway speeds, the lower vacuum in the manifold would draw very little air and vapors through the crankcase breather valve and thus decrease the ventilation of the crankcase at the very time that more ventilation would be required to remove the greater volume of fumes produced at the higher engine speed.

The valve of FIGURE 2 has a body 15 provided with a threaded outlet 16 adapted to be screwed into a tapped hole (not shown) extending through the wall of the intake manifold. An inlet tube 17 is crimped into the body of the valve. The bore 18 of the outlet is restricted by a resiliently mounted throttling plug 19 of hollow truncated conical shape which extends partially into the outlet passage. This plug is maintained in alignment with the outlet by means of a slidable spacing web or spider 20 at the end of the plug riding in the central bore 21 of the valve. It will be noted from FIGURE 3 that portions of this web are cut away to permit the flow of gas and vapors therethrough. There are two passages in the body of the plug; a longitudinal bore 22 of small diameter and a transverse bore 23 of larger diameter. The transverse bore is so located that it is in communication with the inlet at all times even when the throttling plug is seated on the shoulder 24 of the outlet orifice. A helical spring 25 seated on the shoulder 24 bears against the web 20 of the plug thereby holding the plug in the proper position for automatically controlling the flow of gases therethrough. This spring also cooperates with web 20 in keeping plug 19 aligned with outlet passage 18.

When there is a low vacuum (relatively high absolute pressure) in the manifold at normal engine speeds, the spring holds the plug in the open position shown in FIGURE 2 and provides the minimum restriction to flow through the control valve. Flowing gases pass through the annular area between the conical section 26 of the plug and the adjacent shoulder 24 as well as through the transverse and longitudinal bores 22 and 23 within the throttling plug. As the vacuum in the intake manifold increases when the carburetor throttle valve closes, the pressure differential across the breather valve 10 moves the throttling plug 19 toward the outlet orifice thereby bringing the conical surface 26 closer to shoulder 24 and reducing the effective aperture in the valve. When the manifold vacuum is at its maximum (lowest absolute pressure) with the engine idling, the surface 26 may seat on shoulder 24 thereby reducing the effective outlet orifice size to that of the longitudinal bore 22. This automatic reduction of the effective cross section of the breather valve restricts the flow of air and crankcase fumes therethrough to amounts which, at the high pressure differential then applied, will not alter the vaporized gasoline-air mixture in the intake manifold sufficiently to affect the idling engine but are still large enough to thoroughly ventilate the crankcase.

As previously indicated this crankcase breather valve operates under difficult conditions of vibration and temperature changes with corrosive and gum forming materials passing therethrough. For proper maintenance such valves should be tested at suitable intervals and desirably under conditions which closely approximate the operating conditions. Compressing the plug valve spring with a probing device is not an adequate test because the probe could easily move a throttling plug which sticks under normal operating conditions, and moreover would not indicate the condition of either the outlet passage or those passages in the throttling plug. Merely blowing air through the valve would only show that the outlet was at least partially open without indicating the actual condition of the internal passages or even detecting an inoperative throttling plug 19.

The valve testing apparatus of the present invention illustrated in FIGURES 4 to 8, inclusive, is capable of providing complete, rapid and reliable tests of the full operation of these crankcase breather valves on running engines.

Turning now to FIGURE 4, the body 27 of the valve testing device may be made of any suitable shape and of any suitable material. Although close fits are not required in this apparatus it is desirable to employ a material which is relatively easy to machine or to mold or cast. A suitable transparent plastic such as polymethyl-methacrylate is greatly preferred, since it meets these qualifications and furthermore is transparent, thereby permitting visual observation of the indicating elements therein. There are several passageways in the tester body which are preferably but not necessarily of circular cross section for ease of fabrication.

A horizontal conduit 28 extends completely through the length of the body 27 into a connecting tube 29 which is slipped into the inlet 17 of the crankcase breather valve 10 under test as shown schematically in FIGURE 4. The inlet of the valve is held firmly seated against the rubber washer 30 to prevent leakage. In a typical embodiment, the diameter of the main portion of conduit 28 is 0.250 inch but the guide section 31 has a diameter of only 0.195 inch to provide an easy sliding fit for a sensing or follower rod 32 of 0.188 inch diameter mounted therein. A spool-shaped follower piston 33 is coaxially affixed to or integral with the rod near the middle of the rod. This rod is of sufficient length to project beyond the connecting tube 29 into the breather valve under test in order to sense or determine the position of the throttling plug at any instant. Piston 33 has a maximum diameter of 0.240 inch to provide an easy sliding fit in conduit 28 and is desirably opaque or painted so that it may be seen through the transparent body. The guide 31 serves to maintain the entire follower assembly in proper alignment for free movement along the conduit.

A passage 34 of 0.265 inch diameter has one end open to the atmosphere either fully or preferably through a 0.188 inch diameter orifice in the retainer plug 35. A pressure responsive member 36 in the form of a ball, or alternatively a suitably shaped piston, attached to the very light helical spring 37 serves to indicate the pressure differential between the atmosphere and the interior of the valve 10 while testing. Spring 37 is shown seated against the split ring 38 in the passage but it may be seated against the closed end of the passage if desired. While the ball 36 may range in size up to the maximum that will permit a relatively free sliding fit in passage 34, good results have been obtained with an extremely loose fit using a ball of 0.210 inch diameter thereby permitting a major portion of the volume of air flowing through the valve tester to enter the passage through hollow retainer plug 35 and pass around the pressure responsive ball. The retainer plug is not an essential feature of the novel device but is useful in preventing loss of the ball and spring due to rough handling. It is also desirable to use an opaque or colored ball so that it may be seen more easily through the transparent body 27. For more precise observation and recollection of the position of the pressure indicating ball 36 and the follower piston 33, a multi-colored index scale 39 is mounted or painted on one or more sides of the tester body in parallel alignment to both passage 34 and the conduit 28.

A vertical bore 40 of 0.125 inch diameter communicates between the passage 34 and the conduit 28 on the low pressure or suction side of both the ball and of the follower piston 33.

In addition there is a short fluid bleeder channel 41 of 0.125 inch diameter adapted for selective communication between the atmosphere and the suction or closed end of the passage 34. To regulate the flow of air or other fluid through the bleeder channel, a sliding gate 42 is dovetailed into the top of the valve tester body. This gate, which is provided with a tapered V-shaped opening 43, may be moved to any selected position across the open end of bleeder channel 41 to limit the effective cross sectional area of the channel to any desired extent. A recess 44 in the exposed face of the gate permits it to be readily moved to the desired position by pushing with a thumb nail. FIGURE 5 illustrates the gate in both retracted and advanced positions, using dotted lines for the latter.

Another modification of the slidable gate is illustrated in FIGURE 7 wherein a graduated series of orifices 45, 46 and 47 is provided in gate 48. In this version, orifice 45 may have the same cross sectional area as bleeder channel 41 while the areas of orifices 46 and 47 are desirably one-half and one-quarter of the area of the channel. The adjustable bleeder is provided to calibrate the tester with respect to different models of valves to be tested. The bore 22 is varied in size in different models of valve and the tester is generally set to provide a bleeder orifice corresponding in diameter to the diameter of bore 22 of the valve tested. Suitable indicia may be placed on the gate 42 and adjacent surfaces of body 27 to indicate calibrating positions of the gate.

This adjustable fluid bleeder means has several additional functional effects available at the option of the operator. First, it permits regulating the air flow to avoid or minimize any excessive pressure drop through the testing device, thereby closely simulating actual operating conditions wherein the inlet of the valve is connected by tubing 12 to a crankcase rather than the testing device. It will be appreciated that a lower than normal pressure in the central chamber 21 of the breather valve 10 for any selected engine speed will allow the throttling plug 19 to move to an abnormal position somewhat further away from its seat on shoulder 24 thereby reducing the significance of the test results. Secondly, the adjustable bleeder feature provides for adjusting the pressure differential across the ball indicator 36 properly relative to the strength of spring 37 and setting the ball in a suitable location along the index scale 39. Control of the air flow through this bypass or bleeder unit also allows the operator to compensate for the influence of gravity so that the testing device may be held horizontally, vertically or in any position which may be required by the position of the inlet of the breather valve 10. It is readily apparent that the pressure indicating ball will act somewhat differently when hanging vertically from the spring than when located vertically above that spring or when the spring is horizontal. The controlled air bleed allows for adequate compensation for these effects. While such compensation probably affects the observed results to some extent, absolute values are not required here, for relative indications are sufficient to determine the degree of operating efficiency of the valve being tested.

Operation of the testing device of the present invention is quite simple and requires no particular skill other than a general understanding of the operation of internal combustion engines. The tester is merely connected to crankcase breather valve 10 firmly to prevent leakage after the tube 12 has been removed from the inlet of the valve. Then the engine is operated at a speed corresponding to customary turnpike speeds, say 2500 r.p.m., and the adjustable gate 42 is moved to bring the indicator ball to approximately the center of the scale 39 if possible. Failure to accomplish this is an indication that the valve under test is blocked and requires cleaning or replacement. After noting the positions of both the ball 36 and the follower piston 33, the operator may next test the valve at an engine speed of 1200-1500 r.p.m. to approximate city or suburban driving conditions and again note the positions of the two indicating elements. A slight movement of each is permissible with such reduction in engine speed. Finally the engine speed should be dropped to an idle in order to determine the performance of the breathing valve under high vacuum conditions. Here the ball should remain in approximately the same location whereas a distinct movement of the follower piston 33 toward valve 10 should be observed inasmuch as the throttling plug 19 should either seat on or closely approach the orifice shoulder 24. These tests can be performed in a matter of minutes to reliably indicate to an unskilled operator the efficiency of the crankcase breather valve over a suitable range of engine speeds.

In operating the testing device a significant portion of the air flowing through the device passes around the ball 36 when the dimensions suggested herein are used. However, a much closer fitting ball or piston may be used in the passage 34 if desired and the major portion of the air would then be admitted through bleeder channel 41, in which case a channel of larger cross section would probably be desirable. Regardless of which is used, the ball indicator is the element which shows the relative subatmospheric pressure existing at the inlet of the breather valve under test. The displacement of this ball from its rest position against the resistance of coil spring 37 is proportional to the pressure difference between the atmosphere and the interior of the valve under test. Once adjusted to a suitable position along the indicator scale the ball should not move much with variations in the engine speed when calibrated in the manner described above. It will be readily seen that other techniques of using the tester are possible and the invention is to be understood to contemplate such variations, one of the values of the device being its flexibility in use.

A minor portion of the air flowing through the valve testing device enters the guide section 31 of the conduit and this provides a slightly higher pressure on the adjacent face of follower piston 33 which pushes the entire follower assembly toward the valve under test. This maintains one end of follower rod 32 in light contact with the throttling plug web 20 enabling it to sense the position of the plug at various engine speeds and intake manifold pressures. A follower piston of relatively small diameter should be used to avoid producing an excessive force which would tend to displace the throttling plug from its normal operating position for the given engine speed. Of course, it is a simple matter for the operator to pull the follower rod and hold it out of contact with the throttling plug if he suspects that the follower rod is affecting the performance of the throttling element. The follower unit may also be used manually as a probe for determining relative to the indicator scale whether the throttling plug has a full range of free travel and also whether the throttling plug spring 25 is broken.

While the apparatus of this invention has been described in its application to the testing a single specific type of vacuum control valve, it may be used or adapted for testing other valves capable of controlling liquids or gases under a wide range of higher pressures by suitable modifications known to those skilled in the art. The dimensions given hereinabove are exemplary and will facilitate the understanding and construction of the novel device; however, it is to be understood that considerable departures therefrom may be made to suit particular needs. Moreover, it will be apparent to those skilled in the art that many other modifications can be made in the shape and structure of the novel device. Accordingly, the detailed description hereinabove is to be interpreted as illustrative and not in a limiting fasihon.

I claim:
1. A device for testing a fluid control valve comprising a body provided with a conduit adapted for connection to said valve, a passage in the body having one section in communication with a fluid source and another section in communication with the conduit, a pressure respon- sive member resiliently mounted in the passage, a fluid bleeder means connecting the conduit with the fluid source for controlling the pressure drop of fluid flowing through the body, whereby the pressure responsive member indicates by proportional displacement the pressure differential between the fluid source and the interior of said valve during tests under simulated valve operating conditions.

2. A device according to claim 1 comprising a follower reciprocably mounted in the conduit and extending therebeyond for sensing the position of a movable element of said valve.

3. A device according to claim 1 comprising a pressure driven follower reciprocably mounted in the conduit and extending therebeyond for continuously sensing and indicating the position of a movable element of said valve during tests under simulated valve operating conditions.

4. A device according to claim 1 in which the fluid bleeder means is adjustable and comprises a channel in the body and a movable gate for selectively restricting the flow of fluid through the channel.

5. A device according to claim 4 in which the gate is slidably mounted and provided with a tapered opening.

6. A device according to claim 4 in which the gate is slidably mounted and provided with a graduated series of orifices of decreasing diameters.

7. A device according to claim 1 in which both the passage and the pressure responsive member are of circular cross section with a loose fit therebetween and the resilient mounting comprises a helical spring, whereby at least a portion of the fluid flow through the device induced by a pressure differential flows past the pressure responsive member.

8. A device according to claim 1 which also comprises means for determining the position of the pressure responsive member.

9. A device according to claim 1 in which the body is constructed of a transparent material, thereby permitting visual observation of the position of the pressure responsive member.

10. A device according to claim 1 in which the body is constructed of a transparent material and provided with a scale aligned parallel to the passage, thereby permitting visual observation of the position of the pressure responsive member relative to the scale.

11. A device for testing an automatic vacuum control valve comprising a body of transparent material provided with a conduit adapted for connection to said valve, an air pressure driven follower reciprocably mounted in the conduit and extending therebeyond for continuously sensing and indicating the position of a movable throttling element of said valve, an air bleeder channel in the body communicating with the atmosphere, a passage of circular cross section in the body having one end in substantially free communication with the atmosphere and another end in communication with both the conduit and the air bleeder channel, a pressure responsive indicator ball of substantially smaller diameter than the passage attached to a helical spring therein, a gate provided with an opening therein and slidably mounted across the bleeder channel for selectively restricting the flow of air therethrough to control the pressure drop of air flowing through the body, and a scale on the body for visual determination of the positions of the ball and of the follower relative to the scale, whereby a substantial proportion of the air flow induced by a pressure differential between the atmosphere and the interior of said valve passes around and displaces the indicator ball proportionally to the pressure differential when testing under simulated operating conditions.

No references cited.